ROTARY MULTIPLE RACK PHONOGRAPH RECORD CABINET

Filed Oct. 2, 1947 4 Sheets-Sheet 1

JOHN SCUDERI
INVENTOR

BY Joseph Blacker
ATTORNEY

ROTARY MULTIPLE RACK PHONOGRAPH RECORD CABINET

Filed Oct. 2, 1947 4 Sheets-Sheet 2

JOHN SCUDERI
INVENTOR

BY Joseph Blacker
ATTORNEY

Oct. 3, 1950 J. SCUDERI 2,524,275

ROTARY MULTIPLE RACK PHONOGRAPH RECORD CABINET

Filed Oct. 2, 1947 4 Sheets-Sheet 3

JOHN SCUDERI
INVENTOR

BY Joseph Blacker

ATTORNEY

ROTARY MULTIPLE RACK PHONOGRAPH RECORD CABINET

Filed Oct. 2, 1947 4 Sheets-Sheet 4

JOHN SCUDERI
INVENTOR
BY Joseph Blacker
ATTORNEY

Patented Oct. 3, 1950

2,524,275

UNITED STATES PATENT OFFICE 2,524,275

ROTARY MULTIPLE RACK PHONOGRAPH RECORD CABINET

John Scuderi, Brooklyn, N. Y.

Application October 2, 1947, Serial No. 777,484

2 Claims. (Cl. 312—11)

This invention relates to a phonograph record cabinet and particularly to a cabinet having a plurality of racks rotatably mounted therein and having means for bringing a selected rack into position outside the cabinet for removing a desired record.

An object of this invention is to provide a phonograph record cabinet having a plurality of rotatable racks of equal length, each rack having data for identifying the records stored therein, and the upper walls of the cabinet having a viewing aperture extending the entire length of a rack, and through which the user may see all the data relating to the records on the particular rack exposed to view for ease in selecting a desired record.

Another object of this invention is to provide a mechanism for suspending a plurality of record racks from radial arms spaced in equal angular relation about a rotatable shaft, and to provide means for bodily shifting the shaft and racks forwardly to bring a selected rack into viewing position.

Another object of this invention is to provide a rotary multiple rack phonograph record cabinet having a transparent window in its cover and comprising two transverse tracks, a shaft rotatably and swingably mounted on the tracks, the shaft having radial arms secured thereto in equally spaced angular relation, a plurality of racks suspended from the arms and being in pivotal relation with the arms, means for shifting the shaft forwardly on the tracks to bring the racks forwardly, and means for rotating the shaft to bring one of the racks and records into uppermost and viewing position through the window, for selecting and removing a desired record from the uppermost rack.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which.

Figure 2:
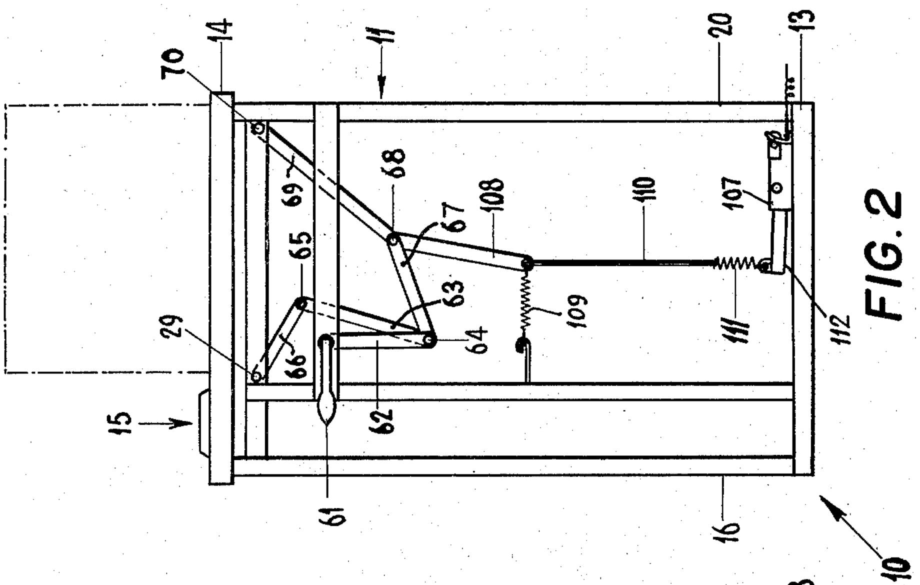
Figure 2 is a side elevation of the cabinet shown in Figure 1.

In the illustrated embodiment of the invention, the numeral 10 indicates a selective phonograph record cabinet, comprising a cabinet casing 11, having side walls 12 connected by a base 13 and a cover 14.

The cover 14 has a transparent rectangular window 15 near the front wall 16, the window extending the entire distance between two skeleton partition walls 17. The walls 12 and 17 are spaced apart to provide compartments 18 in which shift mechanism may freely operate. The cabinet has a rear wall 20.

Between the two end compartments 18 is a record chamber 21 for three racks 22 of identical length and each suited for carrying a large number of disk records 23.

Figure 5:
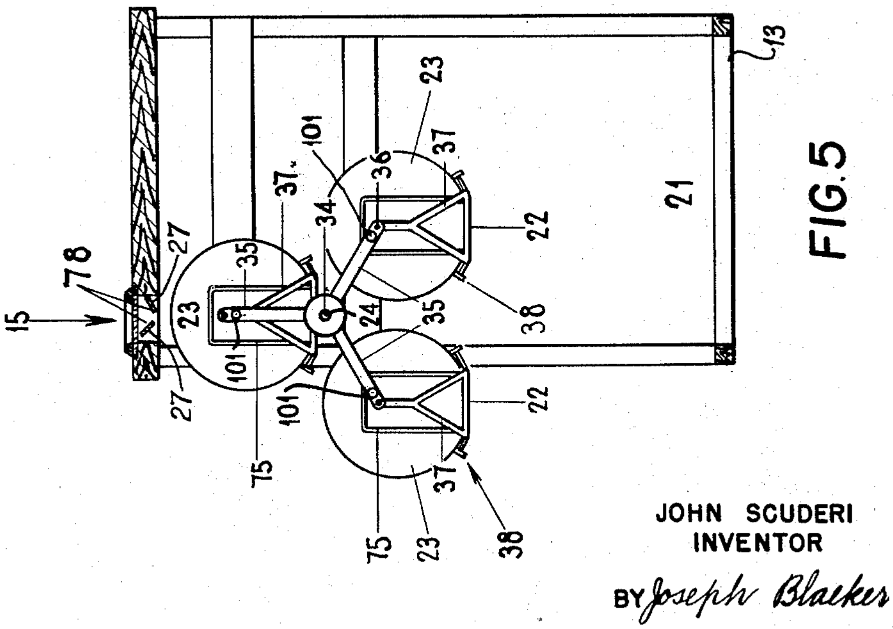
Figure 5 is a cross-sectional view, the section being taken as on line 5—5 in Figure 1.

As shown in Figure 5, the racks 22 are suspended from a drive shaft 24 extending across the outer surfaces of the record chamber 21.

The drive shaft is rotatably supported in main ball bearings 25, one at each end of the shaft 24.

Two shift arms 26 have their upper ends fixed to a cross rod 29. The rod 29 is rotatably mounted in bearings 30 at each end. At the lower ends of the shift arms 26 are slots 31 through which the main shaft 24 passes. The slots have the same width as the diameter of the drive shaft 24.

The main ball bearings 25 are adapted to contact a horizontal track 32. The track extends from the front portion of the cabinet to substantially its mid-portion. The track 32 is formed with curved ends 33 against which the ball bearings 25 abut and bring the shaft to a stop at the front or rear of the record chamber 21.

As shown in Figure 5, the drive shaft 24 carries a fixed disk 34 and three radial arms 35 which are fixed thereto and are spaced in equal angular relation from each other.

Pivotally suspended from pins 36 at the free ends of each of the arms 35 are triangular brackets 37 which are connected by the racks 22. In the position shown in Figure 5, one of the racks 22 is in uppermost position and in central alinement with the window 15 through which the disk records 23 may be viewed.

Records 23 are placed in each rack 22 in the order indicated by numerals 1 to 66, reading from left to right, on an index plate 38 mounted on the base portion of each rack, each number corresponding to a particular record. It is to be noted that two index plates or record number plates 27 are also fixed beneath the window 15. The window is electrically illuminated by means of a switch operated by a handle 39.

Figure 6:
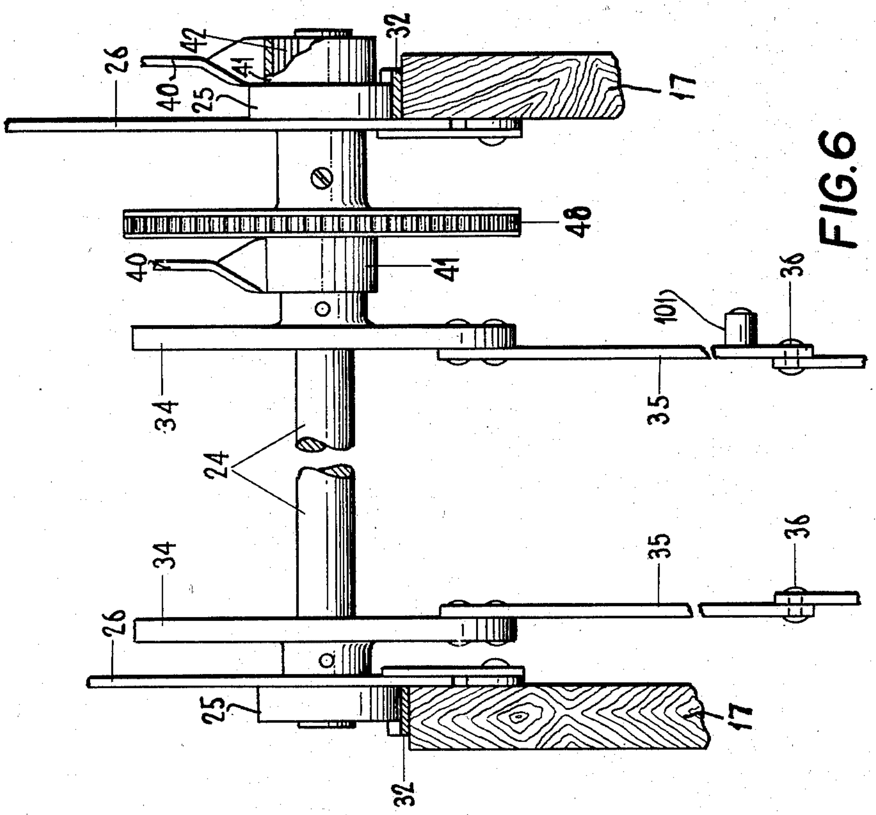
Figure 6 is a front view of a fragmentary portion of mounting mechanism for the drive shaft, on an enlarged scale.

As shown in Figure 6, the drive shaft 24 is supported on main ball bearings 25 which are adapted to rotate on horizontal tracks 32. At one end of the shaft 24 is a bifurcated frame 40, the forks of which terminate in circular housings 41 which carry ball bearings 42 through which the shaft 24 passes.

At the rear of the bifurcated frame 40 is a shaft 44 on which is supported a small sprocket gear 45 and a large sprocket gear 46. Mounted on the shaft 24 is a large sprocket gear 48 which is connected by a sprocket chain 49 with the small sprocket gear 45.

Fixed to the rear wall 20 of the cabinet 10 is a bracket 50 at the free end of which is a shaft 51. Rotatably mounted on the shaft 51 is a small sprocket gear 52 and a large sprocket gear 54, the small sprocket gear 52 being connected with the large sprocket gear 46 at the free end of the frame 40. It is to be noted that the frame 40 maintains the spaced-apart relation of the shafts 24 and 44 and that an arm 53 maintains the spaced-apart relation of the shafts 44 and 51. The large sprocket gear 54 on the bracket 50 is connected by a sprocket chain 55 with a small sprocket gear 56 on a motor 60.

It will thus be seen that rotation of the small sprocket gear 56 on the motor 60 will cause rotation of the large sprocket gear 54 on the bracket 50 and the large sprocket gear 46 at the free end of the frame 40 and the large sprocket gear 48 on the drive shaft 24. There has thus been provided three speed reductions from the motor sprocket gear 56 to the drive shaft gear 48 for reducing the speed of the drive shaft so that it will rotate very slowly in comparison with the speed of the motor shaft.

Figure 3:
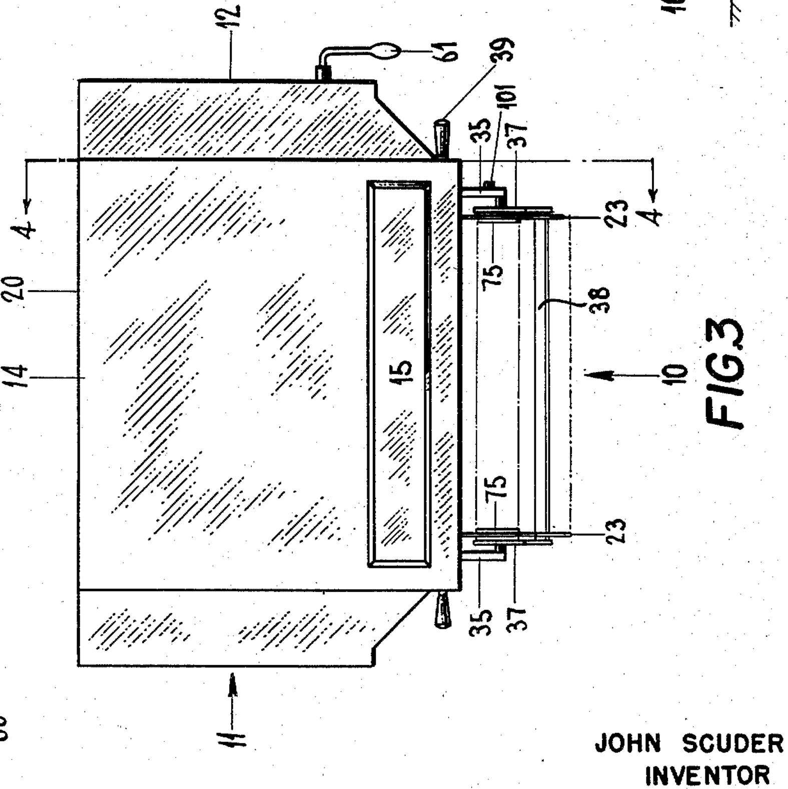
Figure 3 is a top view of the cabinet.
Figure 11:
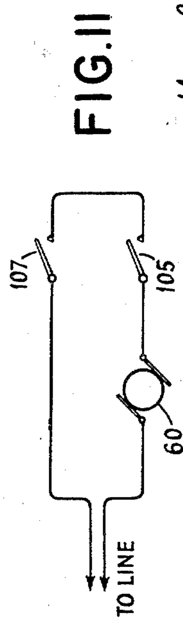
Figure 11 is a diagrammatic view of the electric circuit for operating the mechanism.

As shown in Figures 2 and 3, a handle 61 is rotatably mounted at the right hand side wall of the cabinet and when swung forward to a horizontal position, it causes an arm 62 which is suitably fixed to the handle 61 to swing to the vertical position shown in Figure 2. A link 63 is pivotally connected to a pin 64 at the lower end of the arm 62. The upper end of the link 63 is pivotally connected by a pin 65 to an arm 66 which is fixed to the cross rod 29 at its upper end. This upward movement of the handle 61 causes the cross rod 29 to swing in a clockwise direction and the shift arm 26 to swing forward toward the front of the cabinet 10. This causes the drive shaft 24 and the attached racks 22 to move forwardly of the cabinet. In this position of the racks, the user may remove a selected record from the uppermost rack.

It is to be noted that during the upward movement of the handle 61 a link 67 pivotally secured to the pin 64 is also moved in the direction of the front of the cabinet.

The upper end of the link 67 is pivotally secured by a pin 68 to an arm 69 which is fixed to a cross rod 70 at the rear of the cabinet 10.

Figure 8:
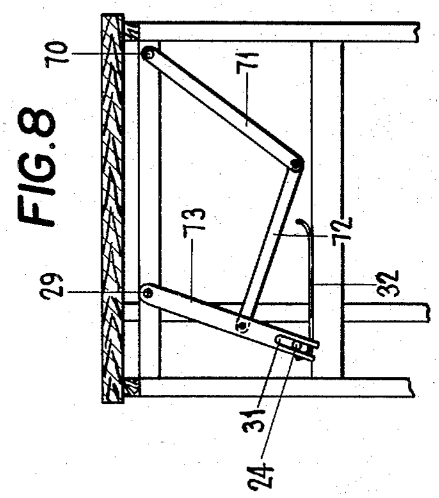
Figure 8 is a view of a fragmentary portion of the framework showing supplementary linkage for shifting the multiple rack unit.

As shown in Figure 8, the cross rod 70 has a supplementary arm 71 which is pivotally connected by a link 72 to a supplementary shift arm 73. The supplementary mechanism relieves the strain on the front cross rod 29 and makes for ease in shifting of the multiple rack unit.

As shown in Figure 5, each rack 22 carries record supporting wire frames 75 which are spaced apart sufficiently to permit free passage therebetween for the records.

Figure 1:
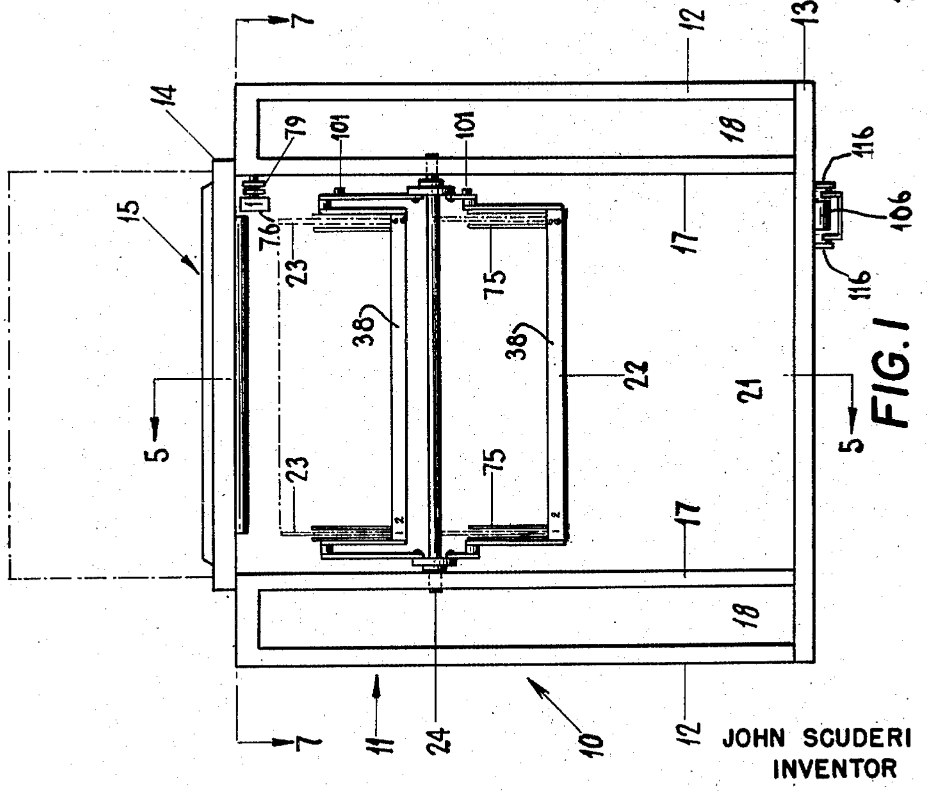
Figure 1 is a front elevation of the multiple phonograph record cabinet, with the covering panel removed to show the mechanism therein.

For the purpose of indicating to the operator which rack 22 is in viewing position through the window 15, I provide a rotatably mounted indicator 76 shown in Figure 1.

Figure 9:
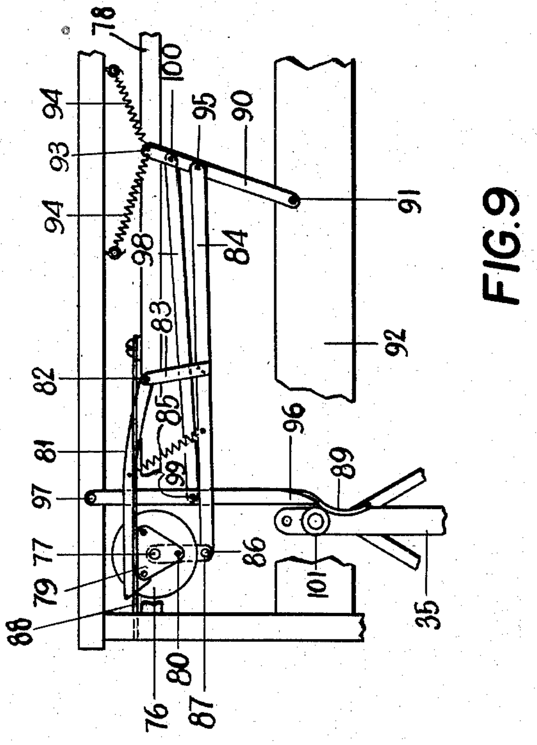
Figure 9 is a view of a fragmentary portion of the framework showing indicator operating mechanism.
Figure 7:
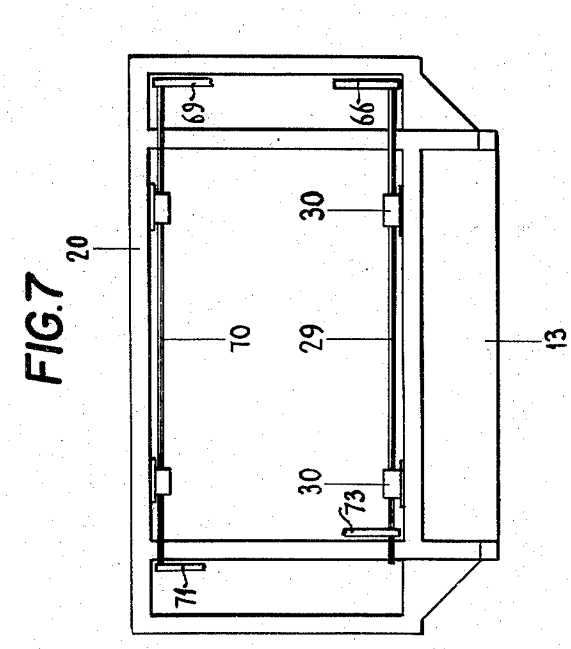
Figure 7 is a top plan view of the cabinet with the cover removed, the view being taken as on line 7—7 in Figure 1.
Figure 10:
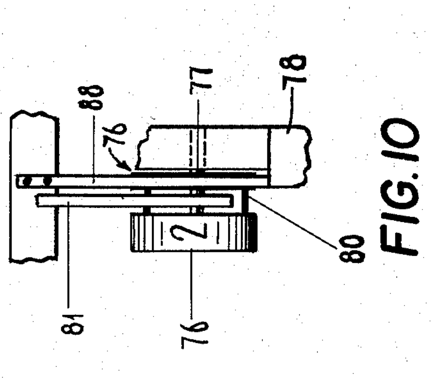
Figure 10 is a view of a fragmentary portion of the framework, on an enlarged scale, showing pawl mechanism for rotating the indicator.

Figure 9 shows the indicator 76 rotatably mounted on a shaft 77 fixed in a cross-bar 78.

The indicator 76 has three numbers 1, 2 and 3, each number corresponding to a respective rack, the numeral 1 appearing in Figure 1. I have fixed a triangular plate 79 to the rear face of the indicator 76 by three pins 80. I have provided a pawl 81 pivoted at 82 to an upright extension 83 of a link 84. The pawl is urged downwardly by a spring 85. It is to be noted that the triangular plate 79 is fixed to the indicator 76 so that each side will line up with a number on the indicator.

The front end of the link 84 is pivotally secured by a pin 86 to an upright link 87, the upper end of which is pivotally mounted on the indicator shaft 77.

An arm 90 is pivotally mounted by a pin 91 to a cross-bar 92. The free end 93 of the arm 90 is secured intermediate two alined coil springs 94, 94 having their outer ends fixed to the cross-bar 78. The rear end of the link 84 is pivoted to the arm 90 by a pin 95.

I have provided an upright actuating arm 96 having its upper end pivotally mounted by a pin 97 to the cross-bar 78. The lower end of the actuating arm 96 is bent to provide a curved cam portion 89. A link 98 is pivotally connected at the front end by a pivot 99 to the actuating arm 96 and is pivotally connected at its rear end by a pin 100 to the arm 90.

As shown in Figures 5 and 6, I provide a roller 101 on each of the three arms 35 which extend from the drive shaft 24.

When the racks 22 are rotated, the rollers 101 swing in a circular path and successively contact the curved cam portion 89 of the actuating arm 96. The rollers 101 cause the actuating arm 96 to swing towards the rear of the cabinet 10. When the rollers actuate the arm 96, they cause the front spring 94 to be tensioned. When a roller 101 comes into disengagement with the arm 96, the tensioned spring 94 brings the arm 96 back to its normal upright position.

During the rearward movement of the arm 96, the links 84 and 98 are moved rearwardly. The rearward movement of the link 84 causes the pawl 81 to be moved rearwardly and this causes rotation of the indicator 76 through one-third of its circumference. The indicator is then in position to be moved through another one-third of its circumference when the roller 101 repeats its operation of actuating the arm 96.

Figure 4:
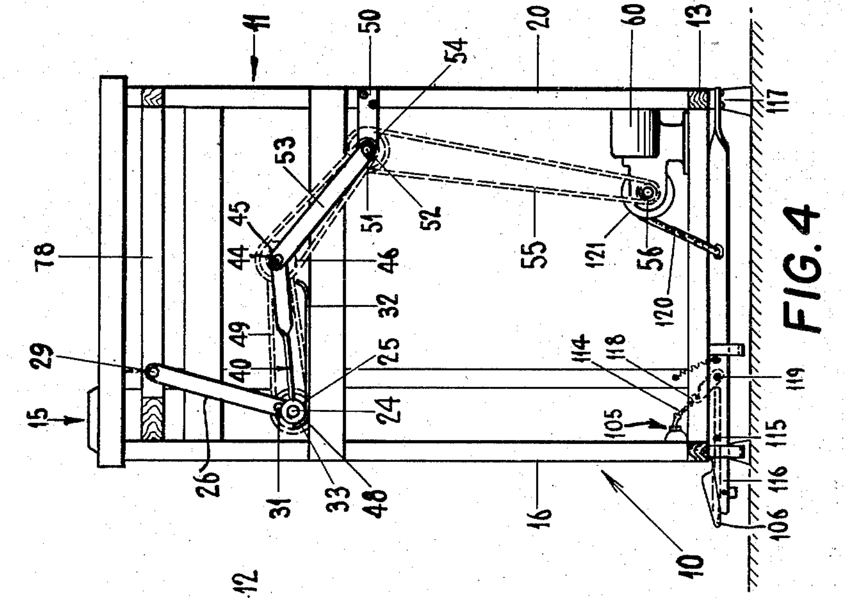
Figure 4 is a cross-sectional view, the section being taken as on line 4——4 in Figure 3.

As shown in Figure 4, I provide a pedal operated electric pull switch 105 suitably secured below the base 13. When the user desires to cause rotation of the shaft 24 and the racks 22 he presses down on a pedal 106 at the front of the machine. This downward movement causes an electric current to pass through the motor 60 which as heretofore described, causes rotation of the racks.

As shown in Figure 2, I provide cutout switch 107 secured to the base 13. It will be noted that a link 108 is pivotally connected to the pin 68 in the link 67. At its lower end, the link 108 is restrained by a horizontal spring 109 to support a rod 110 in an upright position.

The lower end portion of the rod 110 is secured to a tension spring 111 which is connected to the actuating arm 112 of the cutout switch 107.

In the horizontal position of the shift handle 61 shown in Figure 2, the cutout switch 107 is in operating position and causes a supply of electricity to pass through the pedal switch 105.

It will be noted that the electric switches 105 and 107 are interconnected so that when the machine is not in operation, that is, when the shift handle 61 is in vertical inoperative position, any downward movement of the pedal 106 will not cause rotation of the racks 22.

The pedal 106 is pivotally mounted on a pin 115 in a brake rod 116 which is secured to the rear of the machine by screws 117.

An arm 118 is pivoted on a pin 119 in the brake rod 116. The free end of the arm 118 is connected by a spring 114 to the pedal operated switch 105.

Downward movement of the pedal 106 actuates the switch 105 to transmit electric current to the motor 60.

Further downward movement of the pedal 106 cuts out the current to the motor and swings the brake rod downwardly and causes a belt 120 which is suitably connected with a brake pulley 121 and with the brake rod 116 to apply a braking action on the motor 60 and brings the motor to a dead stop and stops the rotation of the racks.

A leaf spring 88 having one end fixed in the framework, rests and exerts a pressure on the triangular plate 79 and when the indicator is rotated by the pawl 81, the leaf spring 88 maintains one of the sides of the triangular plate 79 in horizontal position. This brings one of the numbers on the indicator 76 in topmost position and viewable through the window 15.

In accordance with the patent statutes I have described and illustrated the preferred embodiment of my invention, but it will be understood that various changes and modifications can be made therein without departing from the spirit of the invention as defined by the appended claims.

I claim:

1. In a rotary multiple rack phonograph record cabinet having an open front face and a transparent window in its cover, comprising two transverse tracks, a shaft rotatably and slidably mounted on said tracks, said shaft having radial arms secured thereto in equally spaced angular relation, a plurality of racks suspended from said arms and being in pivotal relation with said arms, each of said racks having record supporting frames, the respective adjacent frames being spaced apart sufficiently to permit free insertion of a record therebetween, whereby said records are prevented from contacting each other, manual means for shifting said shaft forwardly on said tracks to bring said racks forwardly, and power means for rotating said shaft to bring one of said racks and records into uppermost and viewing position through said window, for selecting and removing a desired record from said uppermost rack.

2. In a rotary multiple rack phonograph record cabinet having an open front face and a transparent window in its cover and near said front face, comprising two transverse horizontal tracks having upwardly curved end portions, a shaft rotatably and slidably mounted on said tracks to forward and rearward positions defined by said curved end portions of said tracks, said shaft having radial arms secured thereto in equally spaced angular relation, a plurality of racks suspended from said arms and in pivotal relation with said arms, each of said racks having record supporting frames, the respective adjacent record supporting frames being spaced apart sufficiently to permit free insertion of a record therebetween, whereby said records are prevented from contacting each other, manual means for bodily shifting said shaft and racks forwardly on said tracks to bring said racks forwardly, a pedal operated motor for rotating said shaft to bring one of said racks and records into uppermost and view position through said window, for selecting and removing a desired record from said uppermost rack, an electric circuit for said motor comprising two switches in series, said manual shifting means closing one of said switches to permit downward movement of said pedal to close the other switch to energize said motor.

JOHN SCUDERI.

REFERENCES CITED

The following references are of record in the file of this patent:

UNITED STATES PATENTS

| Number | Name | Date |
|---|---|---|
| 1,785,954 | Hayes | Dec. 23, 1930 |
| 1,988,917 | Rauch | Jan. 22, 1935 |
| 2,185,869 | Seeley | Jan. 2, 1940 |
| 2,424,144 | Bruen | July 15, 1947 |

FOREIGN PATENTS

| Number | Country | Date |
|---|---|---|
| 210,768 | Great Britain | Oct. 30, 1924 |